United States Patent [19]

Funke

[11] 4,119,244

[45] Oct. 10, 1978

[54] UNITARY MOUNTED AIR-PRESSURE PUMP AND LIQUID OUTLET

[75] Inventor: Peter Funke, Sundern, Fed. Rep. of Germany

[73] Assignee: Gebrüder Funke, Sundern, Sauerland, Fed. Rep. of Germany

[21] Appl. No.: 778,717

[22] Filed: Mar. 17, 1977

[30] Foreign Application Priority Data

Oct. 9, 1976 [DE] Fed. Rep. of Germany ... 7631698[U]

[51] Int. Cl.² .............................................. B65D 83/14
[52] U.S. Cl. ............................. 222/400.8; 222/401; 417/511
[58] Field of Search .................... 417/550, 511; 222/400.5, 400.8, 568, 401

[56] References Cited

U.S. PATENT DOCUMENTS

| | | | |
|---|---|---|---|
| 359,023 | 3/1887 | Matthews | 222/400.8 X |
| 1,372,968 | 3/1921 | Lowy | 222/400.8 UX |
| 1,402,222 | 1/1922 | Evans | 417/511 |
| 1,711,914 | 5/1929 | Wepplo | 417/511 |
| 1,906,354 | 5/1933 | Andreasen | 222/400.8 |
| 1,915,728 | 6/1933 | Grabler | 222/400.8 X |
| 1,993,255 | 3/1935 | Baggett et al. | 222/400.8 |
| 2,996,225 | 8/1961 | Pike | 222/568 X |
| 3,018,022 | 1/1962 | Jones | 222/401 X |
| 3,129,857 | 3/1964 | Croy et al. | 222/400.8 |

*Primary Examiner*—David A. Scherbel
*Attorney, Agent, or Firm*—Michael J. Striker

[57] ABSTRACT

An arrangement has a hand-operated piston pump mountable on a neck of a bottle, and having a first portion outwardly embracing the neck and a second portion inwardly extending into the neck of the bottle. The first portion of the piston pump overlaps the neck over at least a part of its height and is supported by the same. The second portion is formed as a ring-shaped collar. For sealingly connecting the second portion to the neck of the bottle, there is provided as a rubber stopper located between the outer surface of the second portion of the piston pump and the inner surface of the neck of the bottle. The second portion may be provided with an inner thread which can mesh with an outer thread of the neck serving for screwing on a threaded cap. A member is further provided for detachably connecting a drink container to the arrangement so that the liquid withdrawing from the bottle travels directly into the container. The piston pump is a compressed air-operated pump and has an interruptable system of channels provided with an air inlet valve and an air outlet valve. The air inlet valve is formed on a piston of the piston pump, and the air outlet valve is formed on the second piston of the latter.

15 Claims, 3 Drawing Figures

UNITARY MOUNTED AIR-PRESSURE PUMP AND LIQUID OUTLET

BACKGROUND OF THE INVENTION

The present invention relates to an arrangement for withdrawing liquid from a bottle, and more particularly to an arrangement comprising a piston pump mountable on the bottle.

Arrangements of this type have been already proposed. Such arrangements have the advantage that they do not require removing of a bottle from its place for withdrawing liquid, such as for instance liquors, from the bottle. This arrangement is especially convenient for use in large drinking establishments in which the bottles are located in a central place and the customers have a possibility to serve themselves. At the same time such an arrangement substantially prevents losses of beverages due to clumsiness of users in handling the bottles for filling glasses.

An arrangement of the above-mentioned type has been proposed comprising a piston pump which has a cylinder for compressed air movable in a direction corresponding to the axis of symmetry of a bottle and relative to an immovable piston forming a channel for passing compressed air therethrough. This construction has the disadvantage that it requires certain skill and experience in operating the same. The above-mentioned arrangement has a downwardly extending portion embracing vertical walls of a body portion of the bottle and, therefore, this arrangement can be mounted only on the narrow bottles which evidently constitutes the essential disadvantage of this construction.

An arrangement for withdrawing liquid from a bottle has been further proposed which is formed as a hydraulic pump having a large chamber surrounding the bottle filled with liquid. In this construction the entire bottle is received in the chamber so that a user cannot see either a content of the bottle or a label fixed thereto. At the same time, such arrangement is applicable only for withdrawing liquid from wine bottles which have substantially identical dimensions. Since the arrangement embraces the entire bottle on the one hand, it is not applicable for use for substantially thick bottles, and on the other hand, when used for thin bottles, it does not assure stable connection with the same due to a gap existing between the outer surface of the thin bottle and the arrangement mounted thereon.

SUMMARY OF THE INVENTION

Accordingly, it is a general object of the present invention to provide an arrangement for withdrawing liquids from a bottle which avoids the disadvantages of the prior art arrangements.

More particularly, it is an object of the present invention to provide an arrangement which is of a simple construction and easily mounted on a bottle with liquid to be withdrawn therefrom.

It is another object of the present invention to provide an arrangement which assures sealingly connecting the same to the bottle and reliably supported by the same.

It is a further object of the present invention to provide an arrangement which does not hinder ascertaining quantity and quality of liquid contained in a bottle by a user, that is, enables the user to see the content of liquid in the bottle and a label fixed to the latter.

It is still a further object of the present invention to provide an arrangement for withdrawing liquid from a bottle which is easy for handling by a user, and its handling does not require any experience or special skill.

It is an additional object of the present invention to provide an arrangement which can be used for bottles having a large variety of dimensions so that the same arrangement can be mounted and used both for thin bottles and for thick bottles, independently of their thickness.

In keeping with these objects and with others which will become apparent hereafter, one feature of the present invention resides, briefly stated, in an arrangement for withdrawing liquid from a bottle which comprises a hand-operated piston pump mountable on the neck of the bottle, the piston pump has a first portion outwardly embracing the neck of the bottle; the first portion of the piston pump overlaps the neck over at least a part of its height and is supported by the same. The piston pump has a second portion inwardly extending into the neck of the bottle, and means for sealingly connecting the second portion of the piston pump to the neck of the bottle. Preferably, the second portion of the piston pump is a ring-shaped collar, and the means for sealingly connecting the second portion to the neck of the bottle is a rubber stopper located between the outer surface of the second portion of the piston pump and the inner surface of the neck of the bottle. The thus-constructed arrangement is easily mounted on the neck of the bottle, and at the same time is sealingly connected to and reliably supported by the bottle. This arrangement can be handled without operational instructions, and by a user which does not have any experience or skill. The user can ascertain both quantity and quality of liquid contained in the bottle, since neither a surface of liquid in the bottle nor a label attached thereto are not obstructed by the arrangement. The arrangement can be mounted on a bottle having any thickness since the thickness of the bottle does not play any role in mounting of the arrangement of the neck of the same. This means that the arrangement can be used both for thin bottles and the thick bottles having a large variety of thicknesses.

Another feature of the present invention is that the inner surface of the ring-shaped collar is provided with an inner thread which can mesh with an outer thread of the neck serving for screwing on a threaded cap. In this case, the arrangement is especially easily mounted on the bottle, and at the same time this assures exact position of the arrangement relative to the bottle and reliable connection of the former to the latter.

Still another feature of the present invention is embodied in means for detachably connecting a drink container to the arrangement so that liquid travels from the bottle directly into the drink container. These means are formed as form-closed member mounted on an outlet pipe of the arrangement. The above-mentioned means, which permit easy detatching the container from the arrangement and at the same time exactly fixing the container relative to the latter in a predetermined position, prevent losses of liquid due to clumsiness of users and collects drops of liquid leaking through the outlet opening.

The piston pump of the arrangement is a compressed air-operated pump having an interruptable system of channels and including an air inlet valve and an air outlet valve. The air inlet valve is a check valve mounted on the second portion of the piston pump, and comprises an outlet bore extending transversely to an air channel provided in the second portion and a blocking element in a form of a ring-shaped rubber member for respectively closing and opening the outlet bore. The inlet valve is operative for respectively communicating an internal air chamber of the piston pump with and separating the same from the ambient atmosphere, and comprises a further sealing member movable in a longitudinal direction and adapted to respectively close through openings in a piston of the piston pump and to release the same during the power stroke and the return stroke of the piston, respectively. Such arrangement is of an especially simple construction, and at the same time reliably performs its functions.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
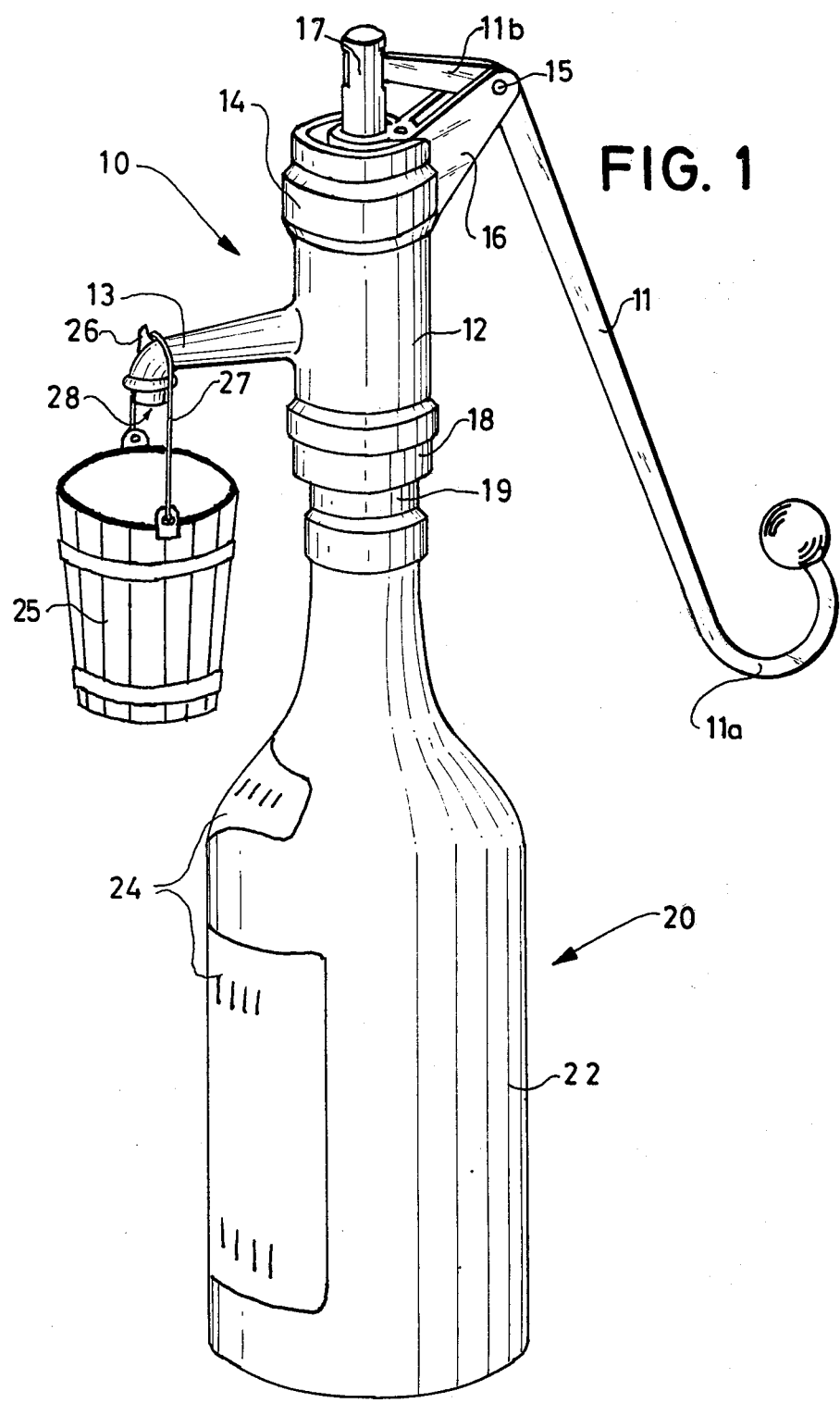
FIG. 1 is a perspective view showing an arrangement for withdrawing liquid from a bottle of the present invention and a bucket-shaped dring container connected to the arrangement.
Figure 2:
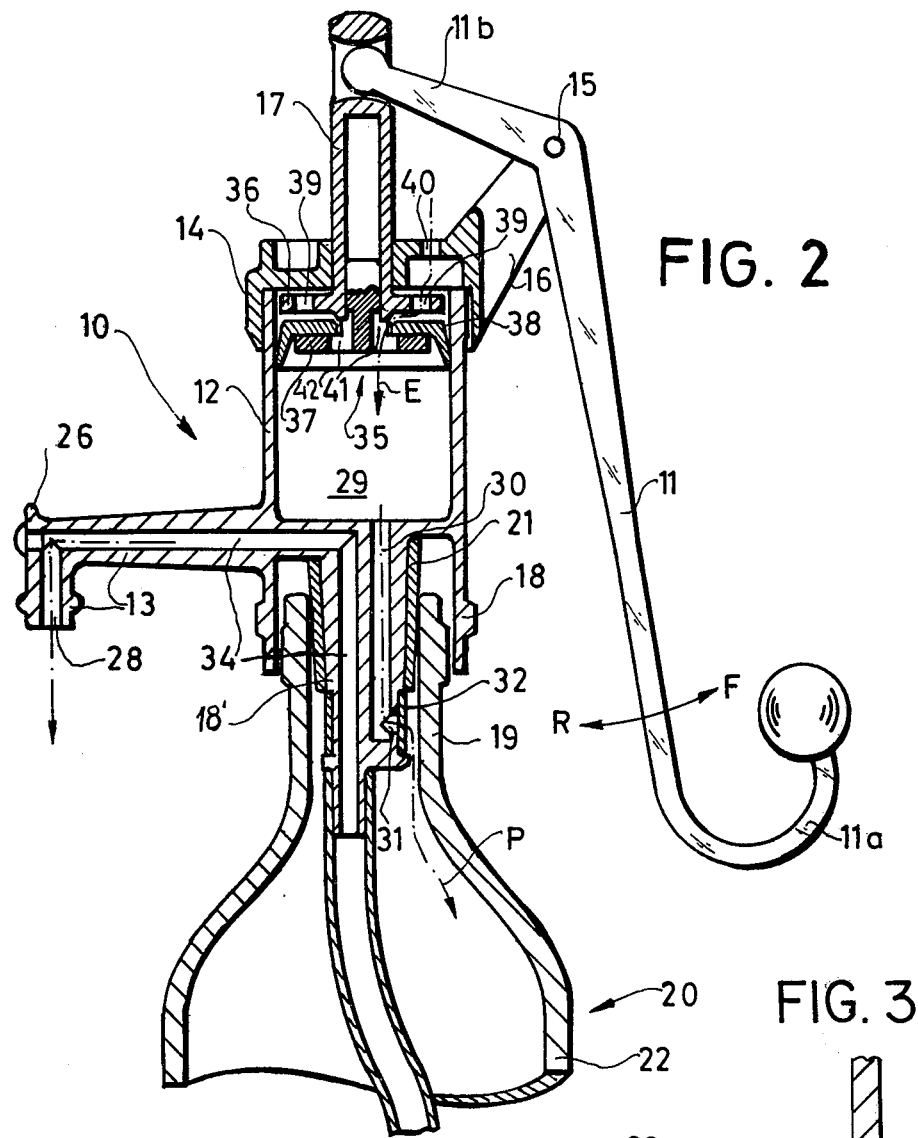
FIG. 2 is a section of an arrangement of the present invention mounted on a bottle.
Figure 3:
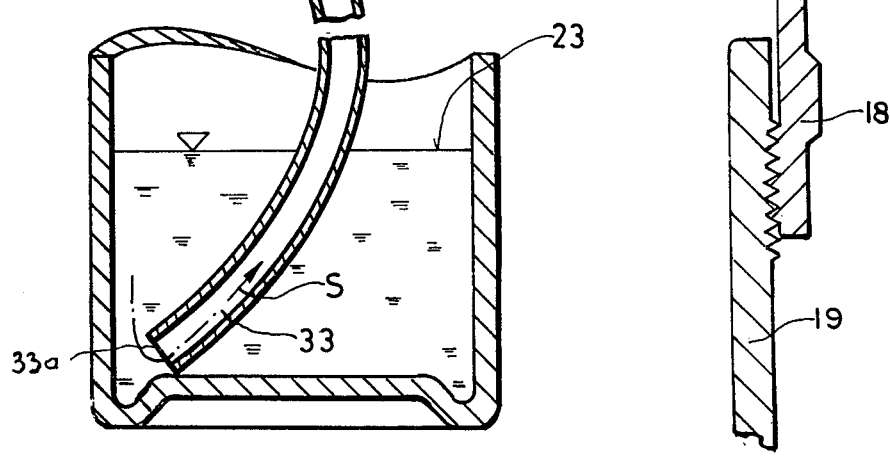
FIG. 3 shows a portion of a ring-shaped collar provided with an inner thread which meshes with an outer thread of the neck of the bottle.

Referring now to FIGS. 1 and 2 of the drawing, it may be seen that an arrangement for withdrawing liquid from a bottle 20 is identified in toto by reference numeral 10 and is formed as a piston pump actuated by a lever 11, which piston pump is well known in the art and can be easily operated by a user. The arrangement comprises a housing 12 of the piston pump having an outlet pipe 13. A cover part 14 upwardly covers the housing 12 and has a bracket 16 carrying an axis 15. The lever 11 is mounted on the bracket 16 pivotally about the axis 15, and has a first arm portion 11a serving as a handle for a user, and a second arm portion 11b movably connected with a piston rod 17 of the piston pump. The piston rod 17 can be moved by the lever 11 in a longitudinal direction substantially lengthwise of the axis of the bottle towards and away from the bottle, respectively.

As may be seen in both Figures of the drawing, the arrangement is mounted on a neck portion 19 of the bottle 20. A first portion of the piston pump formed as a ring-shaped collar 18 outwardly embraces the neck portion 19 of the bottle 20 and overlaps the latter over at least a part of its height. The inner dimension of the ring-shaped collar 18 is such that it is supported by the outer surface of the neck portion 19 of the bottle 20. A second portion of the piston pump 18' inwardly extends into a neck portion 19 of the bottle 20 and is sealingly connected to the same by a rubber stopper 21 located between the outer surface of the second portion 18' of the piston pump and the inner surface of the neck portion 19.

The above-mentioned mounting of the piston pump on the bottle does not depend on shape and dimension of a body portion 22 of the bottle 20. The body portion 22 may be either narrow or bellied, and in any case it does not affect mounting of the piston pump on the neck portion 19 of the bottle 20. At the same time, a surface of liquid 23 in the bottle and a label 24 fixed to the latter are not obstructed and can be easily seen by a user.

The outlet pipe 13 is provided with a projection formed as a form-closed member 26 for detatchably connecting a drink container as, for instance, a bucket 25 to the piston pump. A bracket 27 of the bucket 25 engages the member 26 so that the bucket 25 is hung under an outlet opening 28 of the outlet pipe 13. The bucket 25 can also be used as a test vessel. The member 26 may be formed not as a projection but as a depression in the outer surface of the outlet pipe 13, in which depression the bracket 27 of the bucket 25 may be inserted for hanging up the latter. In both cases, the member 26 must be so mounted on the outlet pipe 13 that the bucket 25 is located exactly under the outlet opening 28 and not displaced relative to the latter to assure travelling of liquid into the bucket 25.

When the neck portion 19 of the bottle 20 has an outer thread for screwing on a thread cap onto the same, a ring-shaped collar 18 may be provided with an inner thread, which can mesh with the outer thread of the neck 19 to permit screwing of the piston pump onto the neck 19 of the bottle 20.

As may be seen in FIG. 2, the pump housing 12, the outlet pipe 13 with the projection 26 and the ring-shaped collar 18 may be constituted by an integral member which is preferably made of a plastic material. The cover portion 14 may be screwed or fitted on the housing 12 of the piston pump.

The housing 12 of the piston pump bounds an internal air chamber 29. An outlet air channel 30 extends from the air chamber 29 and is provided with an air outlet valve on its end opposite to the end communicating with the air chamber 29. This valve comprises an outlet bore 31 extending substantially transverse to the direction of elongation of the air channel 30, and a highly flexible blocking element 32 for respectively closing and opening the outlet bore 31. The air outlet valve 31, 32 is made as a check valve so that compressed air can unimpededly pass through the valve in the direction of the arrow P, but after pumping of compressed air into the bottle 20 backpressure of the thus-pumped-in compressed air presses the blocking element 32 to the outlet bore 31 so as to close the latter and prevent compressed air from travelling in the opposite direction, that is from body portion 22 of the bottle 20.

An uptake 33 is mounted on the second portion 18' of the piston pump and communicates with a liquid channel 34 so that liquid can travel from the body portion 22 at the bottle 20 through the uptake 33 into the liquid channel 34 and then into the outlet pipe 13 to thereafter pass outside through the outlet opening 28.

A piston 35 of the piston pump is identified in toto by reference numeral 35 and comprises two discs 36 and 37 spaced from one another in the longitudinal direction so as to form a gap therebetween. The upper disc 36 of the piston 35 is of one piece with the rod 17 and consists of the same material of which the rod 17 consists. The upper disc 36 has air openings 39. The lower disc 37 of the piston 35 is formed as a separate member connected with the hollow piston rod 17 by means of a plug connection. A sealing element 38, for instance of rubber, is located in the gap formed between the discs 36 and 37, and has a dimension in the longitudinal direction lesser than the respective dimension of the gap. The sealing element 38 is movable in the longitudinal direction. The air openings 39 of the upper disc 36 and the sealing element 38 from an air inlet valve. The cover portion 14, the sealing element 38 and the lower disc 36 are provided with air openings 40, 41 and 42, respectively.

When the piston 35 is in a position shown in FIG. 2, that is in its upper position, the ambient air travels successively through the air openings 40, 39, 41 and 42 and enters the air chamber 29. When the piston 35 moves downwardly to the lower position the sealing element 38 abuts on the lower surface of the upper disc 36, closes the air openings 39 of the latter and seals the air chamber 29 from above.

The uptake 33 is preferably formed as a flexible pipe of such length that an inlet part 33a of the same reaches the lowest point of the bottle 20 having the maximum capacity and height.

The arrangement for withdrawing liquid from a bottle of the present invention operates as follows:

The piston pump is mounted on the bottle 20. For this purpose the second portion 18′ with the uptake 33 and the rubber stopper 21 is inserted into the neck portion 19 of the bottle. At the same time, the first portion 18 of the piston pump is screwed on the outer thread of the neck portion 18 so that the second portion 18′ of the piston pump is sealingly connected to the inner surface of the neck portion 19 and the first portion 18 of the piston pump is supported by the outer surface of the same. The bucket 25 is hung up on the projection 26. In the position shown in FIG. 2 the ambient air unimpededly travels in the direction of the arrow E successively through the air openings 40, 39, 41 and 42 of the cover portion 14, the upper disc 36, the sealing element 38 and the lower disc 37, respectively, and enters the air chamber 29 of the piston pump when the user moves the first arm portion 11a of the lever 11 in the direction of the arrow F, the second arm portion 11b of the lever 11 moves the piston rod 17 and thereby the piston 35 downwardly in the direction of the lower stroke so that the upper disc 36 of the piston abuts on the sealing element 38, the latter closes the openings 39 of the upper disc 36 and the air chamber 29 is separated from the ambient air. By further moving the first arm portion 11a of the lever 11 in the same direction F the piston 35 compresses the air entered in the air chamber 29 and pumps it in the direction of the arrow P through the air channel 30 and the outlet bore 31 into the body portion 22 of the bottle 20. The thus-pumped-in compressed air presses on the upper surface 23 of the liquid and the latter enters the uptake 33 and travels in the direction of the arrow S through the liquid channel 34, the outlet pipe 13 to thereafter pass through the outlet opening 28 into the bucket 25. The thus-established outflow of liquid is terminated when pressure existing above the upper surface 23 of liquid reaches the value of the atmospheric pressure.

When the first arm portion 11a of the lever 11 is moved in the opposite direction that is in the direction of the arrow R the piston 35 performs its return stroke. In this case the blocking element 32 closes the outlet bore 31, the upper disc 36 of the piston is separated from the sealing element 38 so that the air openings 39 of the upper disc 36 are open and the ambient air unimpededly travels through the openings 40, 39, 41 and 42, and enters the air chamber 29.

It will be understood that each of the elements described above, or two or more together, may also find a useful application in other types of constructions differing from the types described above.

While the invention has been illustrated and described as embodied in an arrangement for withdrawing liquid from a bottle, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement for withdrawing liquid from a bottle, comprising a manually operable air piston pump mountable on the neck of a bottle, said piston pump having a first portion outwardly embracing the neck of the bottle and second portion extending into the neck of the bottle and being provided with an air channel extending substantially lengthwise of said second portion formed with an air outlet channel having a check valve and providing communication between said air pump and the interior of said bottle, said check valve comprising an outlet bore extending in a direction substantially transverse to the direction of the elongation of said air channel and a blocking element for respectively closing and opening said outlet bore; means for actuating said piston pump; means for sealingly connecting said second portion of said piston pump to the neck of the bottle; and liquid outlet means having a lower end extending into the liquid in the bottle and a discharge end outside the bottle, said liquid outlet means forming an uninterrupted passage for the liquid so that during operation of the pump the liquid flows continuously through said liquid outlet means out of the bottle, thereby also preventing creation of an undesired overpressure in said bottle.

2. The arrangement as defined in claim 1, wherein said second portion is a ring-shaped collar.

3. The arrangement as defined in claim 2, particularly for withdrawing liquid from a bottle of the type having a neck provided with an outer thread for screwing on a threaded cap, wherein the inner surface of said ring-shaped collar is provided with an inner thread which can mesh with the outer thread of the neck of the bottle.

4. The arrangement as defined in claim 1, wherein said means for sealingly connecting said second portion to the neck of the bottle is a rubber stopper located between the outer surface of said second portion of said piston pump and the inner surface of the neck of the bottle.

5. The arrangement as defined in claim 1, particularly for withdrawing liquid from a bottle into a drink container, and further comprising means for detachably connecting said drink container to said piston pump so that the liquid withdrawn from the bottle travels into the drink container.

6. The arrangement as defined in claim 5, wherein said piston pump comprises an outlet pipe, said means for detachably connecting are a form-closed member mounted on said outlet pipe.

7. The arrangement as defined in claim 5, wherein said drink container is a bucket-shaped container.

8. The arrangement as defined in claim 1, wherein said piston pump is a compressed air-operated pump having an interruptable system of air channels.

9. The arrangement as defined in claim 8, wherein said system comprises an air inlet valve and an air outlet valve.

10. The arrangement as defined in claim 9, wherein said piston pump comprises an internal air chamber, said air inlet valve being operative for respectively communicating said air chamber with and separating the same from the ambient atmosphere.

11. The arrangement as defined in claim 10, wherein said piston pump comprises a piston movable in a longitudinal direction so as to perform a plurality of power strokes and return strokes and having through openings communicating said air chamber of said piston pump with the ambient atmosphere, said air inlet valve having a further sealing member movable in said longitudinal direction and adapted to close said through openings during the power stroke at said piston so as to separate said air chamber from the ambient atmosphere, and to release said openings during the return stroke of said piston so as to communicate said air chamber with the ambient atmosphere.

12. The arrangement as defined in claim 11, wherein said piston comprises two discs spaced from one another in said longitudinal direction so as to form a gap therebetween, each of said discs being provided with the respective one of said through openings, said further sealing member being located and movable in said gap between said discs of said piston.

13. The arrangement as defined in claim 1, wherein said blocking element is a ring-shaped rubber member.

14. The arrangement as defined in claim 1, wherein said piston pump is coaxially mounted on the neck of the bottle.

15. The arrangement as defined in claim 1, wherein said means for actuating said piston pump comprises a lever pivotably mounted on said piston pump and having one arm portion serving as a handle and second arm portion movably connected with the piston of said piston pump to thereby move the piston between a working stroke and a return stroke.

* * * * *